US011080733B2

(12) United States Patent
Dutta et al.

(10) Patent No.: US 11,080,733 B2
(45) Date of Patent: Aug. 3, 2021

(54) METHODS AND SYSTEMS FOR HARNESSING LOCATION BASED DATA FOR MAKING MARKET RECOMMENDATIONS

(71) Applicant: Visa International Service Association, San Francisco, CA (US)

(72) Inventors: Amitava Dutta, Lane Cove (AU); April Pabale Vergara, Singapore (SG); George Cherukara Joggy, Auckland (NZ)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 16/719,702

(22) Filed: Dec. 18, 2019

(65) Prior Publication Data
US 2021/0192553 A1 Jun. 24, 2021

(51) Int. Cl.
*G06Q 30/02* (2012.01)

(52) U.S. Cl.
CPC ..... *G06Q 30/0205* (2013.01); *G06Q 30/0254* (2013.01); *G06Q 30/0259* (2013.01); *G06Q 30/0261* (2013.01)

(58) Field of Classification Search
CPC ........... G06Q 30/0205; G06Q 30/0254; G06Q 30/0259; G06Q 30/0261
USPC ........................................................ 705/7.34
See application file for complete search history.

(56) References Cited

U.S. PATENT DOCUMENTS

| | | | |
|---|---|---|---|
| 9,697,529 B2* | 7/2017 | Fischer | G06Q 20/209 |
| 2009/0018996 A1* | 1/2009 | Hunt | G06F 16/2264 |
| 2011/0161137 A1* | 6/2011 | Ubalde | G06F 16/24578 705/7.34 |
| 2012/0094639 A1* | 4/2012 | Carlson | G06Q 20/401 455/414.1 |

(Continued)

OTHER PUBLICATIONS

Park, et al., "Location-Based Recommendation System using Bayesian User's Preference Model in Mobile Devices," Ubiquitous Intelligence and Computing, 2007, Springer-Verlag Berlin Heidelberg, 10 pages.*

(Continued)

*Primary Examiner* — Timothy Padot
(74) *Attorney, Agent, or Firm* — Schwabe Williamson & Wyatt, PC

(57) ABSTRACT

A computer-implemented method is disclosed. The method includes using reverse geo-coding to determine user transaction locations for a user, determining a number of user transactions for the user that correspond to each of a plurality of statistical area levels, determining a subdivision of each of the plurality of statistical area levels that has the highest number of domestic card present transactions for the user, identifying an effective area of influence (EAI) for the user, based on a determination of a statistical area level that has the highest number of domestic card present transactions for the user, and accessing geographically classified statistics from public data sources related to one or more of the plurality of the statistical area levels. A location based market recommendation is generated based on the geographically classified statistics and the effective area of influence.

18 Claims, 11 Drawing Sheets

(56) References Cited

U.S. PATENT DOCUMENTS

| | | | | |
|---|---|---|---|---|
| 2012/0226523 A1* | 9/2012 | Weiss | ............... | H04W 4/029 |
| | | | | 705/7.34 |
| 2012/0290446 A1* | 11/2012 | England | ............ | G06Q 30/0282 |
| | | | | 705/27.1 |
| 2014/0283136 A1* | 9/2014 | Dougherty | ......... | G06F 21/6218 |
| | | | | 726/29 |

OTHER PUBLICATIONS

Nomi Enriches Location Marketing Platform With Launch of Proximity Marketing Engine. Internet Wire Jan. 9, 2014: NA.*
Retailer tech creeps into consumers' private lives. Associated Press. Daily Herald (Arlington Heights, IL) Nov. 29, 2013: 8.*

* cited by examiner

US 11,080,733 B2

METHODS AND SYSTEMS FOR HARNESSING LOCATION BASED DATA FOR MAKING MARKET RECOMMENDATIONS

TECHNICAL FIELD

Embodiments of the disclosure pertain to methods and systems for harnessing location based data and, in particular, method and systems for harnessing location based data for making market Recommendations.

BACKGROUND

Systems that store records related to consumer transactions enable merchants to review consumer transaction history in order to understand buying patterns. Such systems allow merchants to see on what dates transactions are made, how many transactions are made, and the most popular transaction locations. Moreover, knowing transaction history enables consumer behavior to be readily tracked. This information enables merchants to understand the routines that consumers follow. In particular, merchants may be able to understand preferences of consumers.

Consumer preferences are expectations, likes, dislikes, motivations and inclinations that drive consumer purchasing decisions. They complement consumer needs in explaining consumer behavior. For example, a consumer that needs food can prefer a particular restaurant, brand and location. Consumer preference is important because it determines what transactions people will make given their circumstances. As such, consumer preference can provide an indication of consumer demand. However, the progress made in utilizing transaction history as a means of fully harnessing the potential of payment transaction records has been limited.

DESCRIPTION OF THE EMBODIMENTS

The embodiments described herein are not intended to be limited to the specific forms set forth herein. The embodiments are intended to cover such alternatives, modifications, and equivalents that are within the scope of the appended claims.

The detailed description that follows includes numerous specific details such as specific method orders, configurations, structures, elements, and connections have been set forth. It is to be understood however that these and other specific details need not be utilized to practice embodiments. In other embodiments, well-known structures, elements, or connections have been omitted, or have not been described in a manner so as not to obscure this description.

Any reference within the specification to "one embodiment" or "an embodiment" is intended to indicate that a particular feature, configuration, structure, or characteristic described in connection with the embodiment is included in at least one embodiment of the present invention. The appearance of the phrase "in one embodiment" in different parts of the specification can refer to different embodiments. Embodiments described as separate or alternative embodiments are not mutually exclusive of other embodiments. Moreover, various features are described which may be included in some embodiments and not by others. In additions, some requirements for some embodiments may not be required for other embodiments.

In the following description, unless indicated otherwise terms such as "accessing" or "determining" or "accessing" or "generating" or the like, refer to the operations and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Transaction Processing Network

Figure 1A:
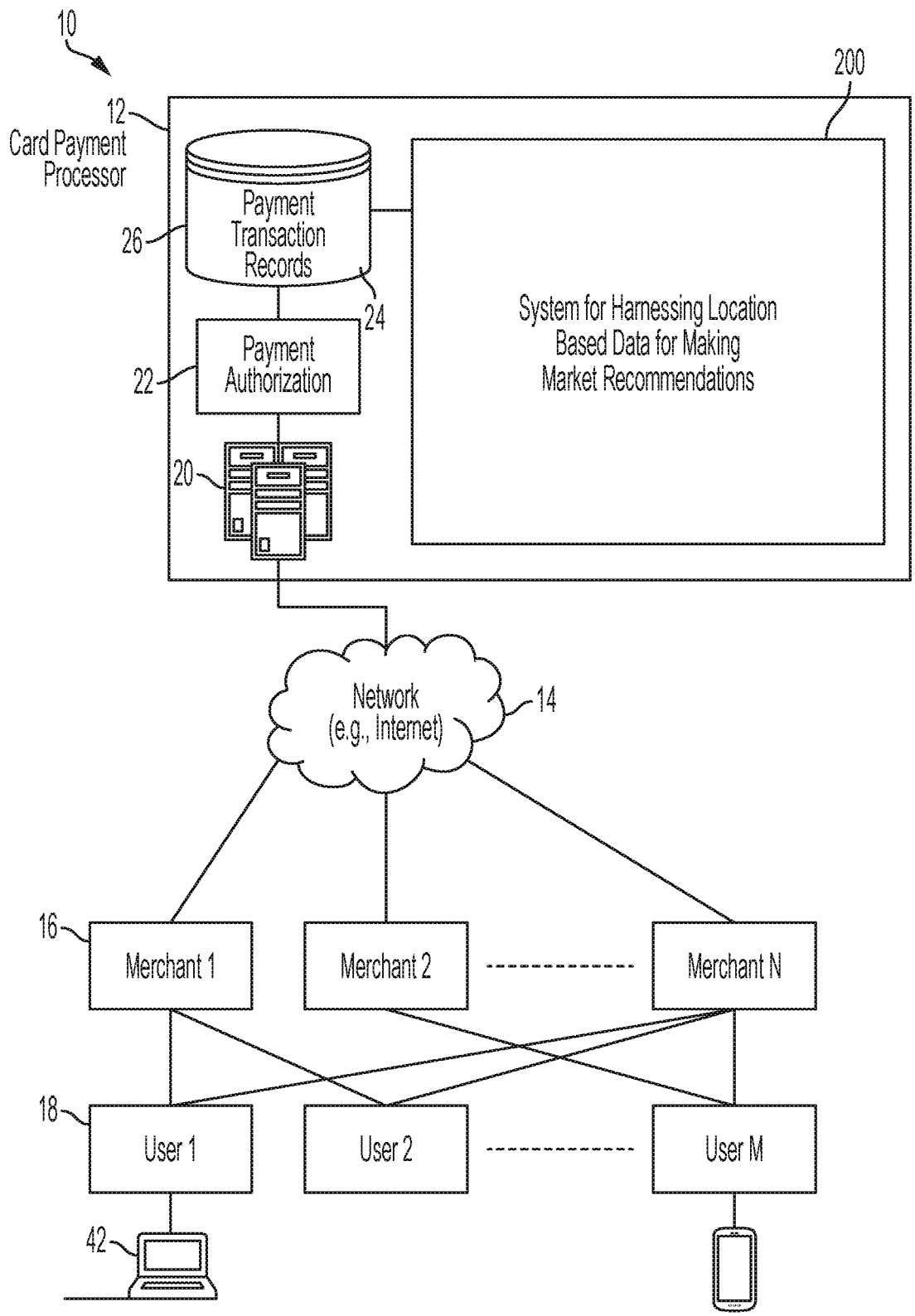
FIG. 1A is a diagram of a transaction processing network in accordance with an embodiment.

FIG. 1A is a diagram of one embodiment of a card payment processing system in which the disclosed embodiments may be implemented. The card payment processing system 10 includes a card payment processor 12 in communication (direct or indirect) over a network 14 with a plurality of merchants 16. A plurality of cardholders or users 18 purchase goods and/or services from various ones of the merchants 16 using a payment card such as a credit card, debit card, prepaid card and the like. Typically, the card payment processor 12 provides the merchants 16 with a servicer or device that allows the merchants to except payment cards as well as to send payment details to the card payment processor over the network 14. In some embodiments, an acquiring bank or processor (not shown) may forward the credit card details to the card payment processor 12. Payment card transactions may be performed using a variety of platforms such as brick and mortar stores, ecommerce stores, wireless terminals, and mobile devices of the users. The payment card transaction details sent over the network 14 are received by one or more servers 20 of the payment card processor 12 and processed by, for example, a payment authorization process 22 and/or forwarded to an issuing bank (not shown). The payment card transaction details are stored as payment transaction records 24 in a transaction database 26. As is well known the servers 20 include memory and processors for executing software components as described herein.

The most basic and common type of payment card transaction data is referred to as a level 1 transaction. The basic data fields of a level 1 payment card transaction are: i) merchant name, ii) billing zip code, and iii) transaction amount. Additional information, such as the date and time of the transaction and additional cardholder information may be automatically recorded, but is not explicitly reported by the merchant 16 processing the transaction. A level 2 transaction includes the same three data fields as the level 1 transaction, and in addition, the following data fields may be generated automatically by advanced point of payment systems for level 2 transactions: sales tax amount, customer reference number/code, merchant zip/postal code tax id, merchant minority code, merchant state code.

System 200 for harnessing location based data for making market recommendations determines a cardholders home and workplace Effective Area of Influence (EAI) and customer attributes to make location based market recommendations. In an embodiment, the EAI is identified based on a determination of a subregion of a statistical area level that has the highest number of transactions for the cardholder. It should be appreciated that although the EAI is described in places herein with reference to the Australian Bureau of Statistics (ABS) the embodiments can be used to identify EAI in any geographic area (e.g., United States, Canada, France, Germany, etc.). In an embodiment, the customer attributes are determined based on geographically classified statistics that are accessed from public data sources, e.g., Australian Bureau of Statistics (ABS), Australian Statistical Geography Standard (ASGS) or equivalent in other countries or geographic areas. In an embodiment, the customer attributes can include but are not limited to demographic, psycho-graphic, geographic, behavioral and/or other attributes from external data sources related to the EAI location. In an embodiment, the knowledge provided by the determined EAI and customer attributes enables a broader understanding of customers that provides a highly informed basis for making market based recommendations.

Operation

Figure 1B:
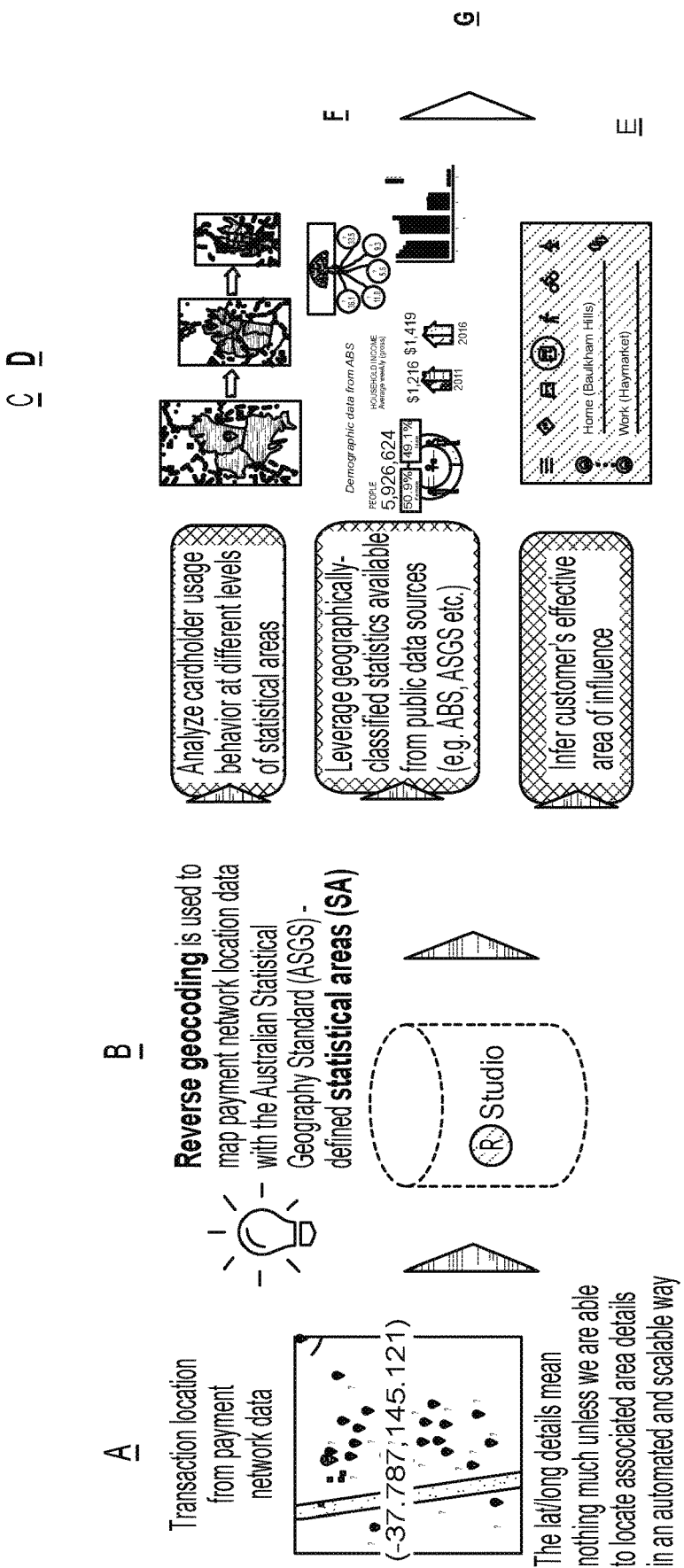
FIG. 1B illustrates operations in a process for harnessing location based data for making market recommendations according to an embodiment.

FIG. 1B illustrates example operations A-G in a process for harnessing location based data for making market recommendations according to an embodiment.

Referring to FIG. 1B, at operation A, a cardholder's transaction location information is obtained from transaction records of a transaction network. In an embodiment, the transaction location information can include but is not limited to latitude and longitude information. In an embodiment, the latitude and the longitude information can be used to identify locations for which externally sourced information can be obtained for purposes of determining customer preferences and choices at a micro level including their most preferred location for transactional activity.

Figure 1C:
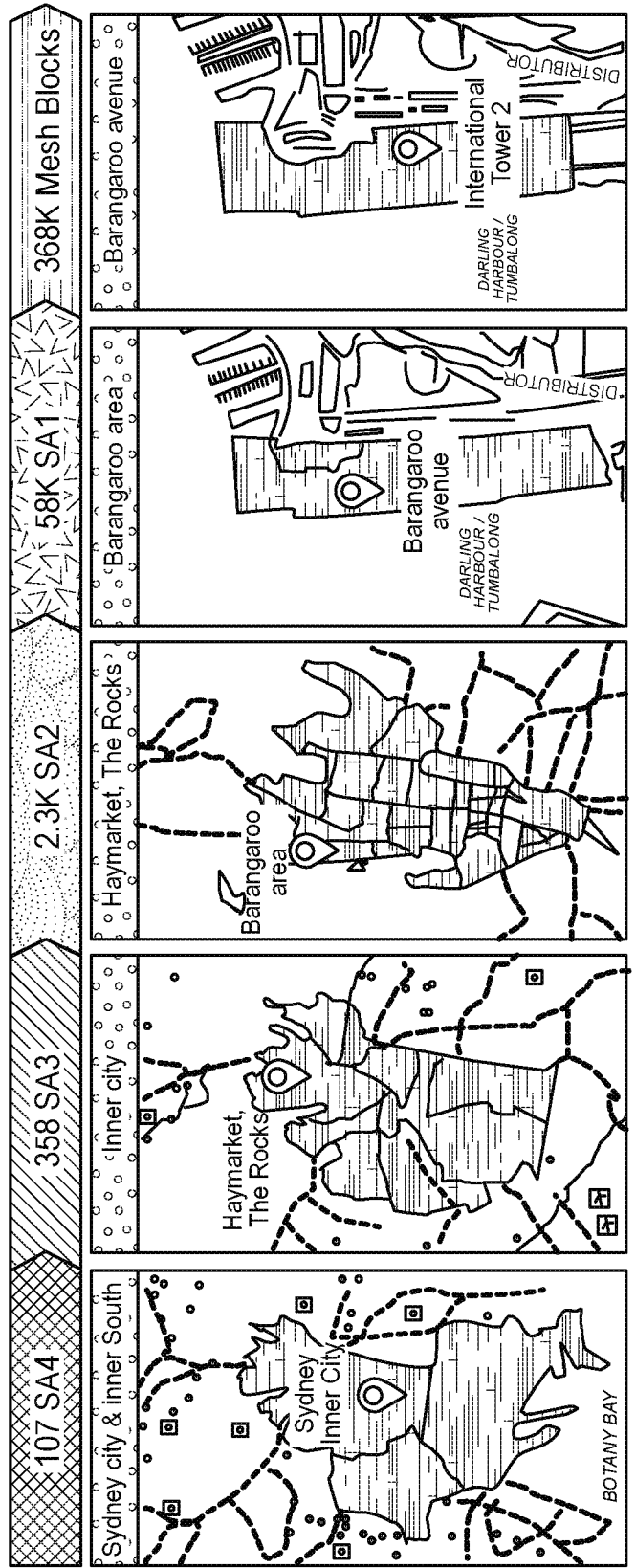
FIG. 1C shows statistical areas and statistical sub-regions of the statistical areas according to an embodiment.

At operation B, reverse geo-coding is used to map cardholder transaction locations to defined statistical areas (defined such as by governmental authority). In an embodiment, the statistical areas are based on geo-spatial areas. In an embodiment, each level of a statistical area can consist of sub-regions. This is illustrated in FIG. 1C, where statistical region Sydney City is shown as including smaller subregion inner city, that includes smaller subregion Haymarket, that includes smaller subregion Bangaroo area, that includes smaller subregion Bangaroo avenue. In an embodiment, the mapping of the location information to respective statistical areas, of increasing granularity, as shown in FIG. 1C, enables a determination of the users' preferences and choices at a micro level including the users most preferred location for transactional activity.

Figure 1D:
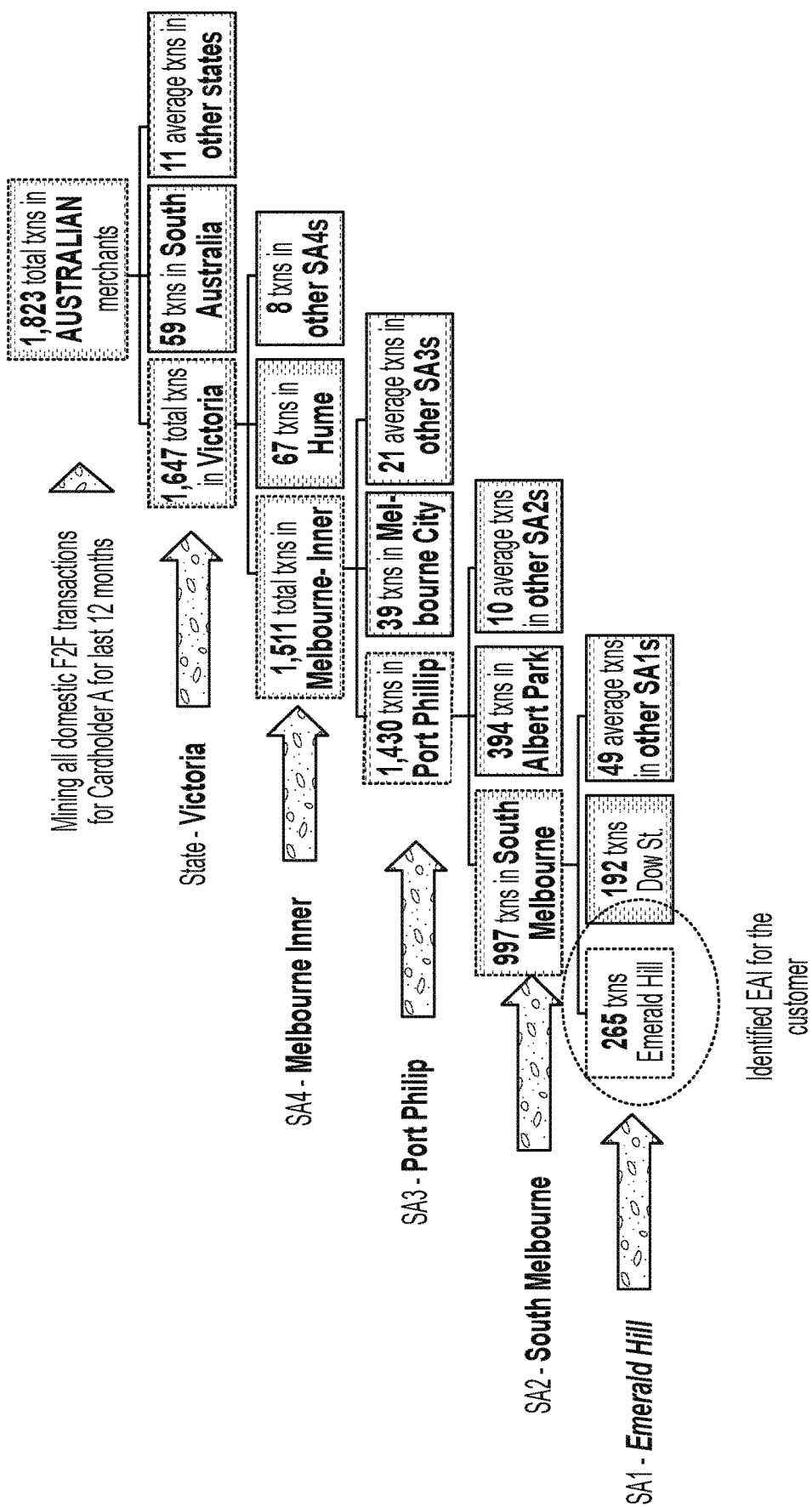
FIG. 1D shows a manner in which the effective area of influence (EAI) can be determined according to an embodiment.

At operation C, the number of transactions of the cardholder that correspond to each of a plurality of statistical area levels and their subregions is determined. In an embodiment, the statistical area levels can include but are not limited to countries, states, counties, cities, regions of cities, neighborhoods, etc. or their equivalents. FIG. 1D shows a plurality of Australia statistical areas and their subregions in which the number of transactions of a cardholder A has been determined. Referring to FIG. 1D, the number of transactions of a cardholder A in Australian states Victoria, South Australia and other Australian states were determined with Victoria determined as the state with the most transactions. The number of transactions for cardholder A in Victoria state subregions Melbourne inner, Hume and other subregions of Victoria state were determined with Melbourne inner determined as the subregion with the most transactions. The number of transactions for cardholder A in Melbourne inner subregions Port Phillip, Melbourne city and other regions of Melbourne inner were determined with Port Phillip determined as the subregion with the most transactions. The number of transactions for cardholder A in the Port Phillip subregions South Melbourne, Albert Park and other subregions of Port Phillip were determined with South Melbourne determined as the region with the most transactions. The number of transactions for cardholder A in the South Melbourne subregions Emerald Hill, Dow Street, and other subregions of South Melbourne were determined with South Melbourne determined as the region with the most transactions.

At operation D, a subregion of each of the plurality of statistical area levels (as shown in FIG. 1B) that has the highest number of transactions for cardholder A is identified. This is illustrated in FIG. 1D. In an embodiment, the subregion of the statistical area level that has the highest number of transactions for cardholder A can be identified by accessing transaction records (such as of payment transaction records 24 of FIG. 1A) and comparing the number of transactions made by cardholder A in each of the subregions of the statistical area to identify the subregion with the most transactions. For example, referring to FIG. 1D, for cardholder A, the statistical areas with the highest number of transactions in the Australian Statistical Geography Standard (ASGS) defined statistical area (SA), are Victoria, Melbourne, South Melbourne, and Emerald Hill.

Figure 1E:
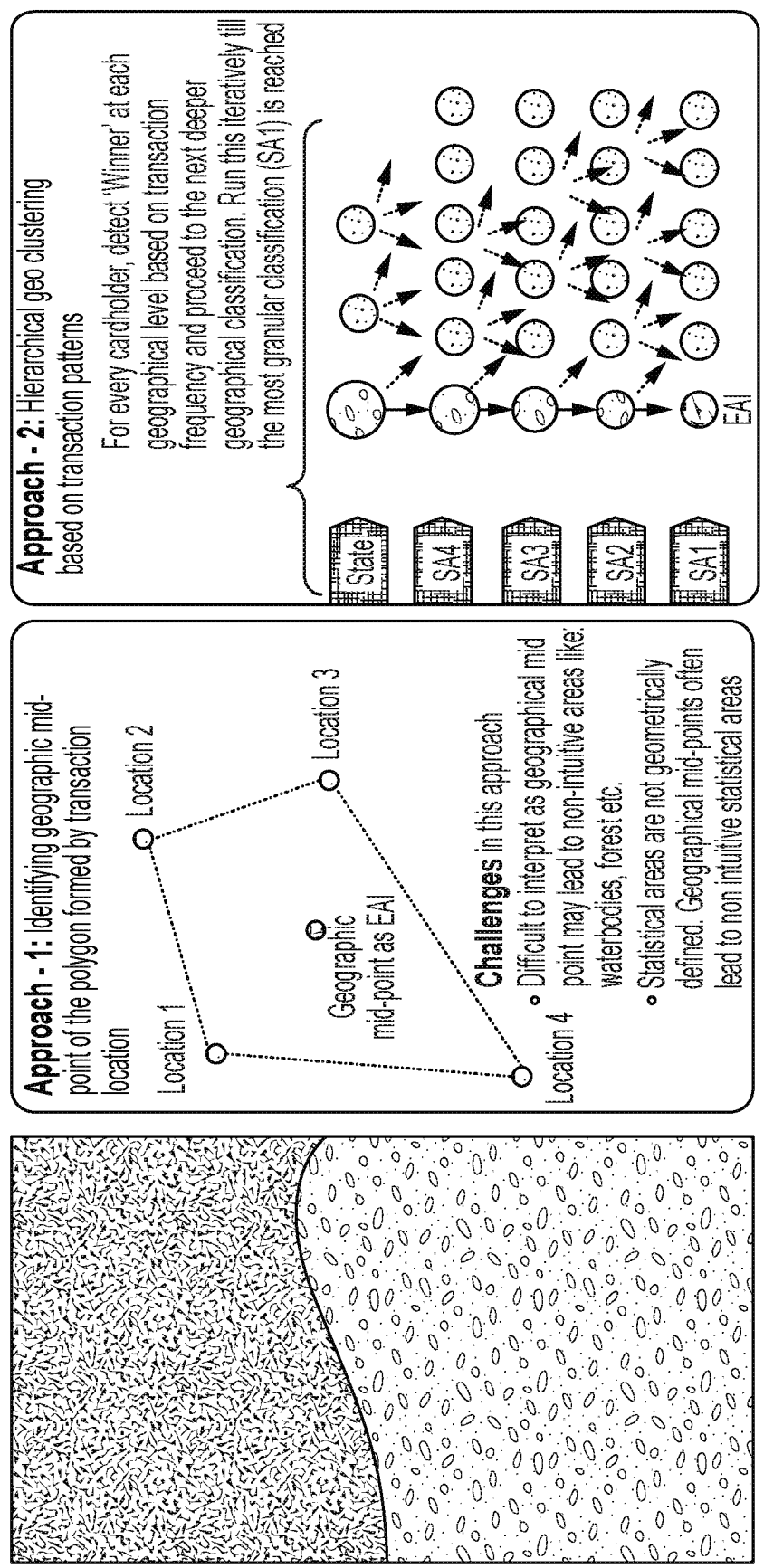
FIG. 1E shows respective manners in which effective area of influence (EAI) can be determined according to an embodiment.
Figure 1F:
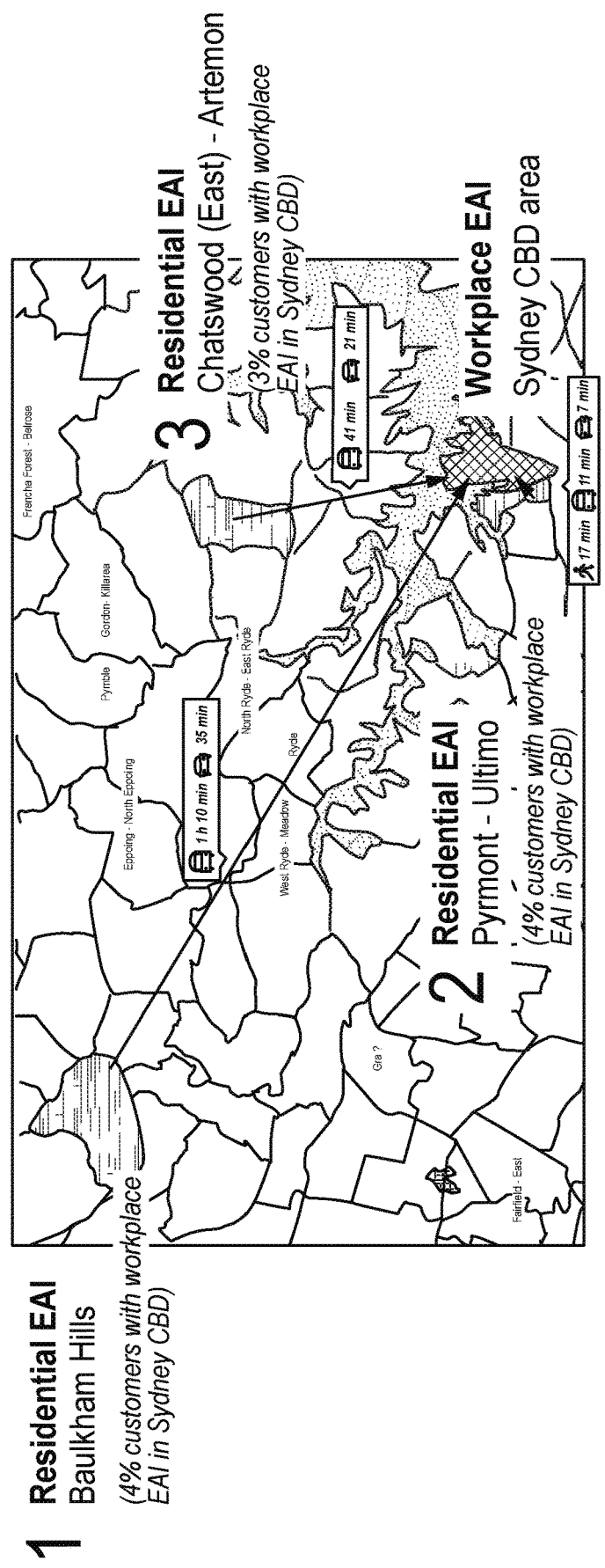
FIG. 1F shows a map that identifies residential and workplace effective area of influence (EAI) according to an embodiment.

At operation E, as illustrated in FIG. 1B, an effective area of influence (EAI) for the cardholder is identified. FIG. 1E shows a first and second manner of determining the EAI. In the first manner, the EAI is determined by locating a geographic midpoint of a polygon formed by cardholder transaction locations. In the second manner, the EAI is determined by identifying the subregion of the lowest statistical area level that has the highest number of transactions for the user. In an embodiment, determining the subregion of the lowest statistical area level that has the highest number of transactions for the cardholder can include determining all face-to-face transactions for a cardholder over a predetermined time period. For example, referring again to FIG. 1D, based on all face-to-face transactions of cardholder A over a predetermined time period Emerald Hill is identified as the subregion of the lowest statistical area level that has the highest number of transactions. The EAI represents the cardholder's most preferred location for any transactional activity. In an embodiment, a residential EAI and a workplace EAI can be determined. In an embodiment, the residential EAI can be determined based on non-discretionary weekend transactions that can include but are not limited to groceries, quick service restaurants (QSRs), fuel, discount stores, pharmacies, etc. Moreover, in an embodiment, the workplace EAI can be determined based on workday transactions. FIG. 1F is a map that delineates the city Sydney Australia and three of its suburbs: Baulkham Hills, Pyrmont, and Chatswood. These suburbs have residents with workplace EAIs in Sydney and residential EAIs in the suburbs. Referring to FIG. 1F, based on EAI data, the actual number of customers who work in Sydney who travel to work from neighboring suburbs can be determined. In addition, based on the EAI data, the percentage of customers from each of the suburbs with a workplace EAI in Sydney can be determined. FIG. 1F illustrates how EAI data can provide location related insight into a cardholder's card usage behavior.

At operation F, as shown in FIG. 1B, geographically classified statistics are accessed from public data sources related to one or more of the plurality of the statistical area levels. In an embodiment, the geographically classified statistics are accessed from public data sources such as but not limited to ABS and ASGS. In an embodiment, geographically classified statistics can include but are not limited to statistics such as population, percentage of population that is male and female, household income per year, household type (couple with children, single parent, etc.) and inhabitant nationality.

Referring again to FIG. 1B, at operation G, based on the geographically classified statistics, and the EAI, a location based market recommendation is generated. In an embodiment, market based recommendations can be made for entities that include but are not limited to merchants and issuers. For example, as regards merchants, this information can be used for: (1) store location optimization, (2) identifying competition landscape in and around a certain radius of the store, (3) identifying micro-marketing opportunities driven by location popularity, and (4) identifying partnership opportunities with local merchants based on correlated spend pattern. As regards card issuers, this information can be used to: (1) track regional brand's performance based on EAI and other location based insights (2) formulate branch location optimization strategy based on location based insights (3) accelerate acquisition by identifying right prospect location for sourcing and micro marketing and (3) facilitate urban planning based on consumer expenditure insights at various neighborhood.

Figure 1G:
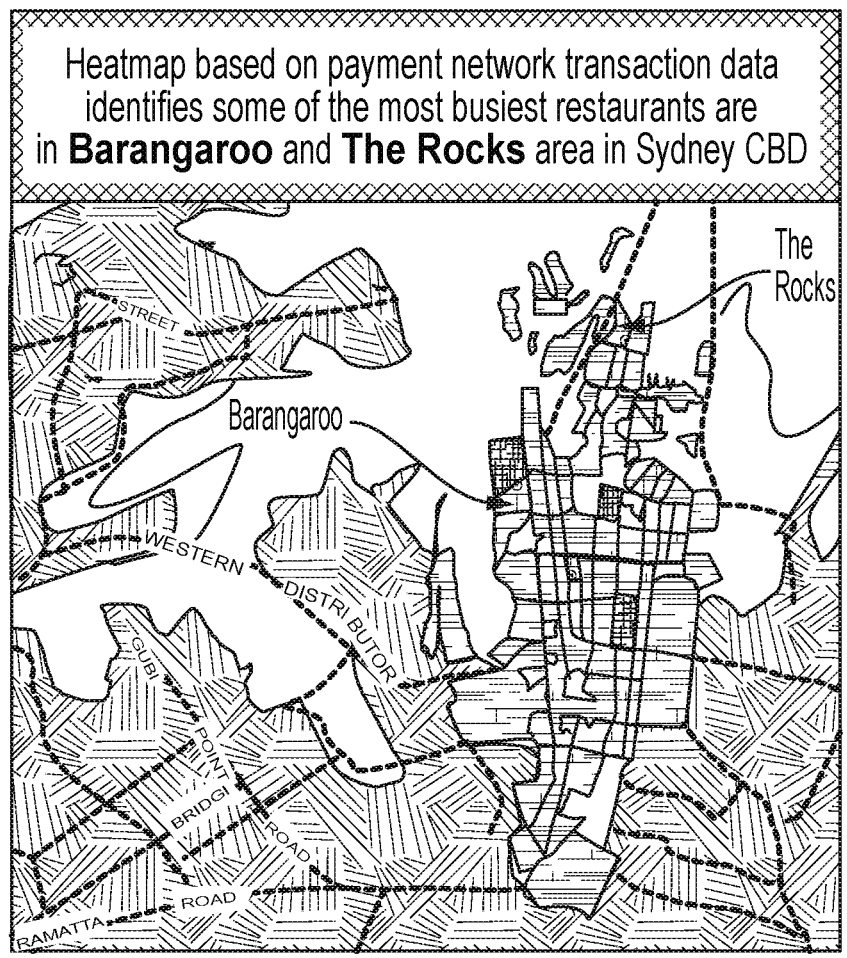
FIG. 1G shows a heatmap that identifies the busiest restaurants based on transaction data according to an embodiment.
Figure 1H:
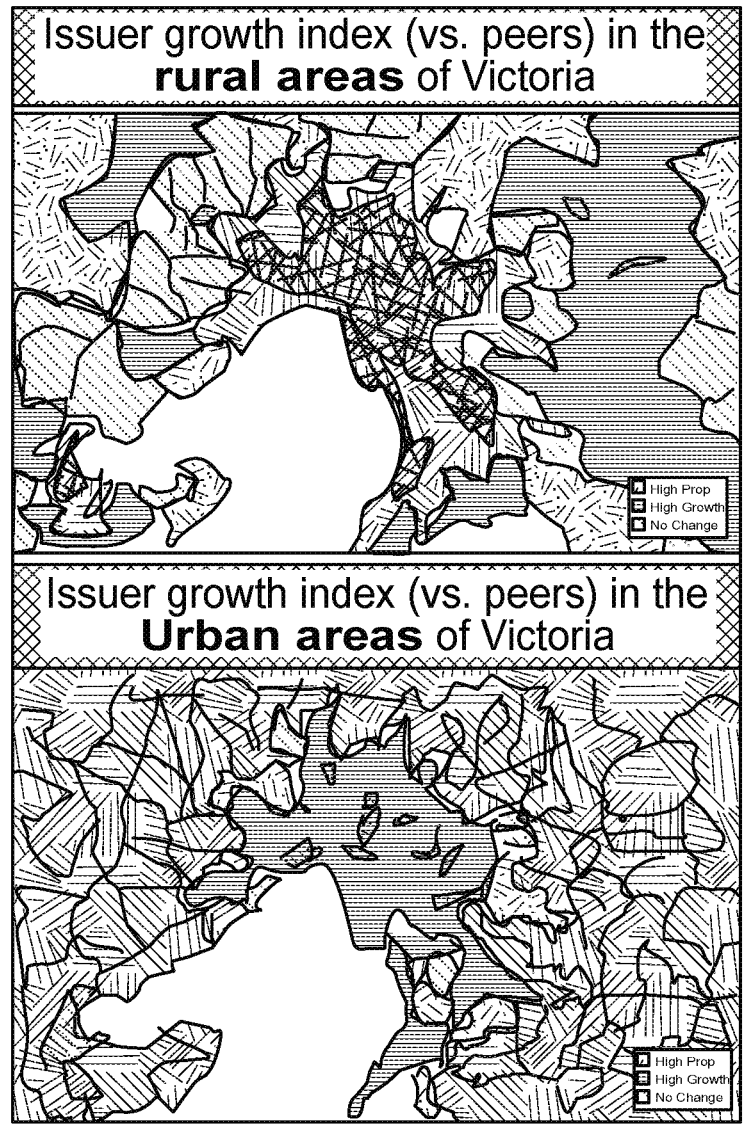
FIG. 1H shows maps that illustrate issuer growth index in rural and urban areas according to an embodiment.

In an embodiment, knowledge gained from cardholder usage behavior in conjunction with geo-spatial insights can help drive deeper engagement with clients such as by supporting the provision of market based recommendations. For example, FIG. 1G shows a heatmap based on transaction data that indicates that the busiest restaurants are in Barangaroo and the Rocks area of Sydney which can be used for such purposes. Moreover, FIG. 1H shows a map that illustrates growth index versus peers in the rural and urban areas of Victoria which can be used for such purposes.

Components of System Location Based Recommendation System

Figure 2:
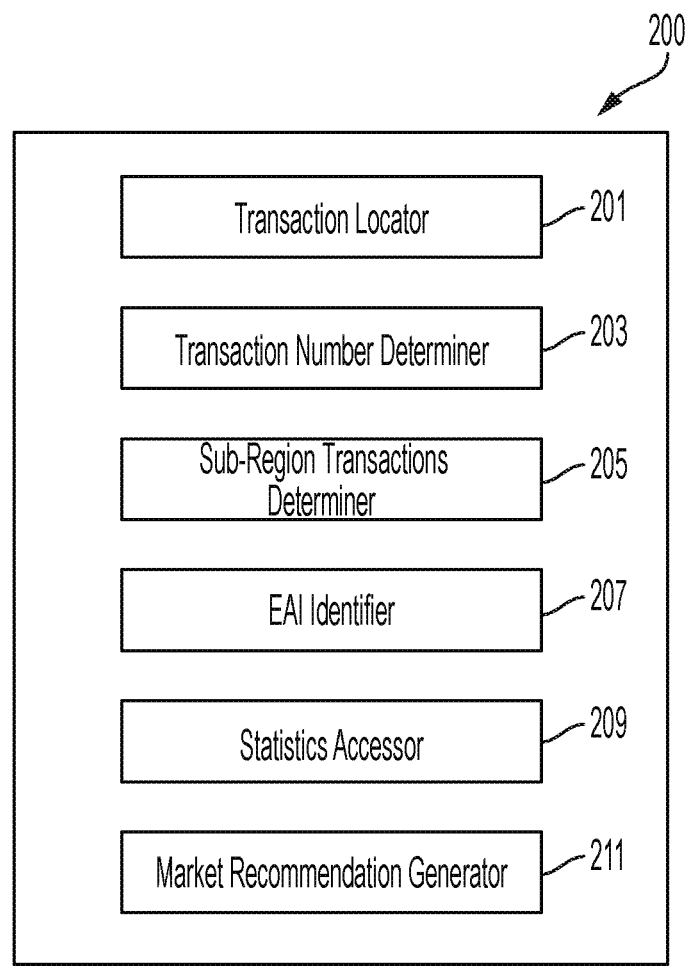
FIG. 2 shows components of a system for harnessing location based data for making market recommendations according to an embodiment.

FIG. 2 shows components of a system 200 for harnessing location based data for making market based recommendations according to an embodiment. In an embodiment, system 200 includes transaction locator 201, transaction number determiner 203, subregion transactions determiner 205, EAI identifier 207, statistics accessor 209 and market recommendation generator 211.

Referring to FIG. 2, transaction locator 201, using reverse geo-coding to determine cardholder transaction locations for a cardholder. In an embodiment, the transaction location information can include but is not limited to latitude and longitude information. In an embodiment, the latitude and the longitude information can provide information that can be used to identify locations for which externally sourced information can be obtained for purposes of determining customer preferences and choices at a micro level including their most preferred location for transactional activity.

Transaction number determiner 203 determines a number of cardholder transactions for the cardholder that correspond to each of a plurality of statistical area levels and subregions. In an embodiment, the mapping of the location information to a defined statistical area enables a determination of the cardholder's preferences and choices at a micro level including the cardholder's most preferred location for transactional activity.

Sub-region transactions determiner 205 determines a subregion of each of the plurality of statistical area levels in which the highest number of transactions for the cardholder were made. In an embodiment, the subregion of a statistical area level that has the highest number of transactions can be identified by accessing transaction records and comparing the number of transactions made by a cardholder in each of the sub-regions of the statistical area to identify the subregion having the most transactions.

EAI identifier 207 identifies an EAI for the cardholder, based on a determination of a statistical area level subregion that has the highest number of domestic card present transactions for the cardholder. In an embodiment, determining a statistical area level that has the highest number of transactions for the cardholder can include determining all face-to-face transactions for an account holder over a predetermined time period.

Statistics accessor 209 accesses geographically classified statistics from public data sources related to one or more of the plurality of the statistical area levels. In an embodiment, the geographically classified statistics are accessed from public data sources such as but not limited to ABS and ASGS. In an embodiment, geographically classified statistics can include but are not limited to statistics such as population, percentage of population that is male and female, household income per year, household type (couple with children, single parent, etc.) and inhabitant nationality.

Market recommendation generator 211, based on the geographically classified statistics, and the determined EAI, generates a location based market recommendation. In an embodiment, market based recommendations can be made for clients that include but are not limited to merchants and issuers. For example, as regards merchants, recommendations can include but are not limited to recommendations related to store location optimization, competition landscape, micromarketing opportunities and partnership opportunities. As regards issuers, recommendations can include but are not limited to recommendations related to tracking regional brand performance, branch location optimization strategy, prospect location for sourcing and micromarketing and urban planning.

FIG. 2 illustrates an example manner of implementing the system 200 of FIG. 1A. In an embodiment, one or more of the elements, processes, components and/or devices of the system 200 may be integrated, separated, re-arranged, omitted, eliminated and/or implemented in other manners. In an embodiment, the components of system 200 can be implemented using hardware, software, firmware and/or any combination thereof. In particular, components of system 200 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). In an embodiment, as regards software and/or firmware implementation of the system 200, at least one of the components of such is/are hereby expressly defined to include a non-transitory computer readable storage device or storage disk such as a memory, a digital versatile disk (DVD), a compact disk (CD), a Blu-ray disk, etc. including the software and/or firmware. It should be appreciated that, the example system 200 can include one or more elements, processes and/or devices in addition to, or instead of, those illustrated in FIG. 2, and/or may include more than one of any or all of the illustrated elements, processes and devices.

Figure 3:
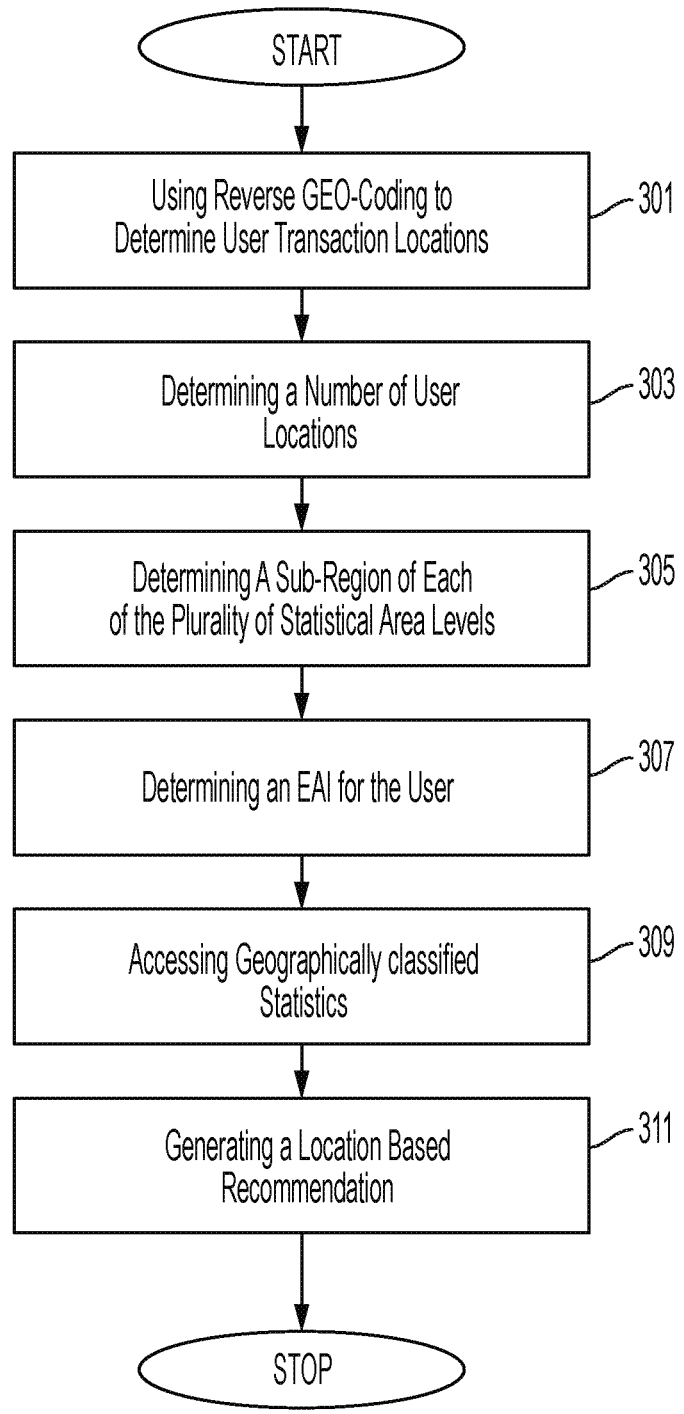
FIG. 3 shows a flowchart of a method for harnessing location based data for making market recommendations according to an embodiment.

FIG. 3 shows a flowchart of the methods for performing the operations of the system 200 of FIG. 1A. In an embodiment, the operations can correspond to machine readable instructions of a program that can be executed by a processor of a computer system 400 such as is discussed with regard to FIG. 4 below. In some embodiments, the program and/or portions or parts thereof can be executed by a device other than a processor. The program can be stored on a non-transitory machine or computer readable storage medium such as a hard drive, a digital versatile disk (DVD), a read-only memory, a compact disk, a floppy disk, a Blu-ray disk, a cache, a random-access memory or other storage device. As used herein, the term non-transitory computer readable medium is intended to refer to computer readable storage devices and/or storage disks and to exclude propagating signals and to exclude transmission media. In some embodiments, the program can be embodied in firmware or dedicated hardware. In an embodiment, one or more of the operations of the flowchart can be performed without executing software or firmware. For example, one or more of the blocks may be implemented by one or more hardware circuits such as a Field Programmable Gate Array (FPGA), an Application Specific Integrated circuit (ASIC), a discrete and/or integrated analog and/or digital circuit, a comparator, an operational-amplifier (op-amp), a logic circuit, etc. It should be noted that the order of execution of the blocks of the flowchart of FIG. 3 may be changed. In addition, one or more of the blocks of the flowchart can be eliminated or added.

Referring to FIG. 3, a computer-implemented method, includes at 301, using reverse geo-coding to determine user transaction locations for a user. At 303, determining a number of user transactions for the cardholder that correspond to each of a plurality of statistical area levels. At 305, determining a subregion of each of the plurality of statistical area levels that has the highest number of transactions for the cardholder. At 307, identifying an EAI for the cardholder, based on a determination of a statistical area level that has the highest number of domestic card present transactions for the cardholder. At 309, accessing geographically classified statistics from public data sources related to one or more of the plurality of the statistical area levels. At 311, based on the geographically classified statistics, and the area of influence, generating a location based market recommendation.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

Figure 4:
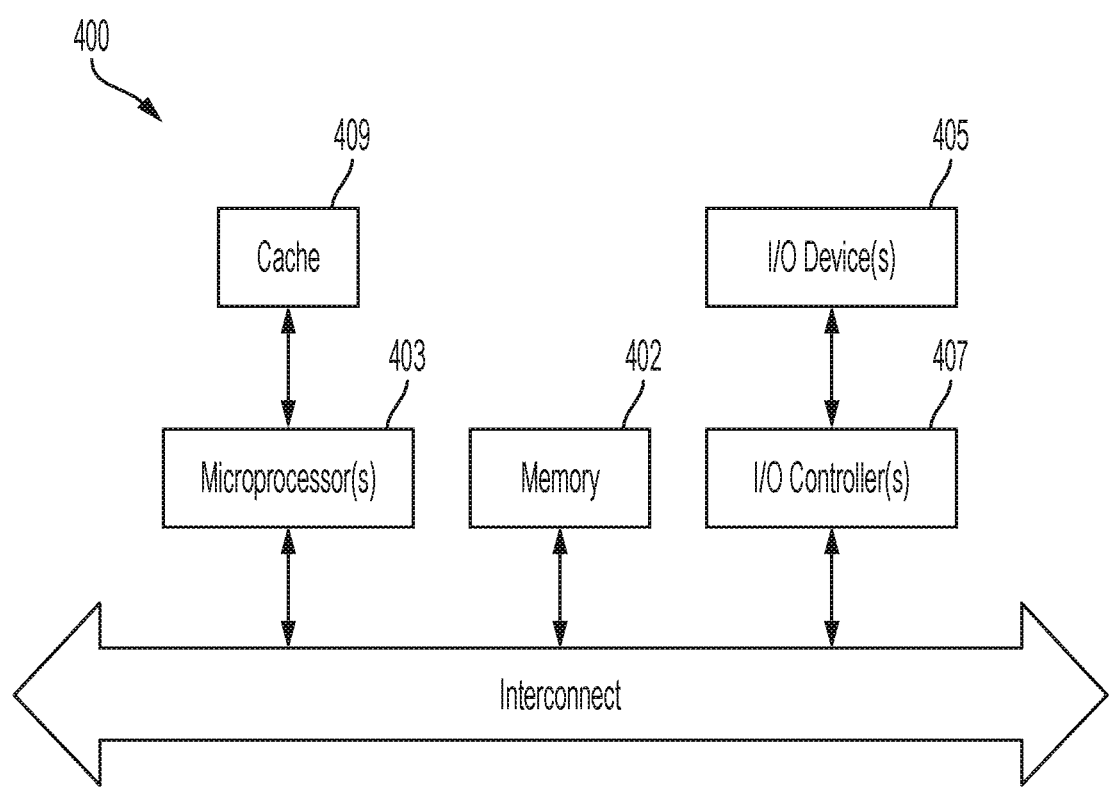
FIG. 4 is a schematic of a computer system according to an embodiment.

FIG. 4 shows a computer system (400) according to an embodiment. The computer system 400 can include a microprocessor(s)(403) and memory (402). In an embodiment, the microprocessor(s) (403) and memory (402) can be connected by an interconnect (401) (e.g., bus and system core logic). In addition, the microprocessor (403) can be coupled to cache memory (409). In an embodiment, the interconnect (401) can connect the microprocessor(s) (403) and the memory (402) to input/output (I/O) device(s) (405) via I/O controller(s) (407). I/O devices (405) can include a display device and/or peripheral devices, such as mice, keyboards, modems, network interfaces, printers, scanners, video cameras and other devices known in the art. In an embodiment, (e.g., when the data processing system is a server system) some of the I/O devices (405), such as printers, scanners, mice, and/or keyboards, can be optional.

In an embodiment, the interconnect (401) can include one or more buses connected to one another through various bridges, controllers and/or adapters. In one embodiment, the I/O controllers (407) can include a USB (Universal Serial Bus) adapter for controlling USB peripherals, and/or an IEEE-1394 bus adapter for controlling IEEE-1394 peripherals.

In an embodiment, the memory (402) can include one or more of: ROM (Read Only Memory), volatile RAM (Random Access Memory), and non-volatile memory, such as hard drive, flash memory, etc. Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DV D RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of the present disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of an application claiming priority to this provisional application to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A computer-implemented method, comprising:
   determining, by a computer server, location-based data for making market recommendations, the computer server having access to: i) a payment transaction database, ii) statistical geography standard data defined by a governmental authority, the statistical geography standard data comprising a plurality of statistical area levels, and iii) one or more public electronic data sources comprising geographically classified demographic statistics, wherein the computer server determines the location-based data by:
   accessing payment transactions records for a cardholder from the transaction database to retrieve transaction locations, including longitude and latitude;
   using reverse geo-coding to map the longitude and latitude information of the transaction locations to the plurality of statistical area levels, wherein the plurality of statistical area levels include countries, states, counties, cities, regions of cities, and neighborhoods;
   determining a number of the payment transactions the cardholder made in the plurality of statistical area levels over a predetermined time period;
   determining a subregion of ones of the plurality of statistical area levels that has a highest number of domestic card present payment transactions for the cardholder; and
   identifying an effective area of influence (EAI) for the cardholder by identifying the subregion of a lowest statistical area level that has a highest number of domestic card present transactions for the cardholder over the predetermined time period;
   accessing geographically classified demographic statistics from the public data sources related to one or more of the plurality of the statistical area levels;
   based on the geographically classified demographic statistics, and the effective area of influence, generate location based market recommendations for merchants and issuers; and
   automatically transmitting the location based market recommendations over a network to at least one of the merchants and issuers.

2. The method of claim 1, wherein identifying the EAI includes identifying an EAI corresponding to a place of residence and a place of work.

3. The method of claim 1, wherein the geographically classified statistics, and the EAI provide a metric for tracking regional brand performance.

4. The method of claim 1, wherein the geographically classified statistics, and the EAI provide a metric for identifying areas for location sourcing and micromarketing.

5. The method of claim 1, wherein the geographically classified statistics, and the EAI provide a metric for estimating consumer expenditure.

6. The method of claim 1, wherein the geographically classified statistics, and the EAI provide a metric for determining where a particular brand has a greatest number of transactions.

7. The method of claim 1, wherein the geographically classified statistics, and the EAI provide a metric for determining areas where a product has a highest number of transactions.

8. The method of claim 1, wherein the geographically classified statistics, and the EAI provide a metric for store location optimization.

9. The method of claim 1, wherein the geographically classified statistics, and the EAI provide a metric for tracking consumer expenditure patterns.

10. The method of claim 1, wherein the geographically classified statistics, and the EAI provide a metric for determining partnership opportunities.

11. The method of claim 1, wherein the geographically classified statistics, and the EAI provide a metric for determining competition landscape.

12. A computer system, comprising:
    data sources comprising:
    a payment transaction database;
    statistical geography standard data defined by a governmental authority, the statistical geography standard data comprising a plurality of statistical area levels;
    one or more public electronic data sources comprising geographically classified demographic statistics;
    one or more processing components having access to the data sources;
    one or more non-transitory data storage components, at least one of the one or more data storage components including instructions that when executed cause at least one of the one or more processing components to:
    access payment transactions records for a cardholder from the transaction database to retrieve transaction locations, including longitude and latitude;
    use reverse geo-coding to map the longitude and latitude information of the transaction locations to the plurality of statistical area levels, wherein the plurality of statistical area levels include countries, states, counties, cities, regions of cities, and neighborhoods;

determine a number of the payment transactions the cardholder made in the plurality of statistical area levels over a predetermined time period;

determine a subregion of ones of the plurality of statistical area levels that has a highest number of domestic card present payment transactions for the cardholder; and identify an effective area of influence (EAI) for the cardholder by identifying the subregion of a lowest statistical area level that has a highest number of domestic card present transactions for the cardholder over the predetermined time period;

access geographically classified demographic statistics from the public data sources related to one or more of the plurality of the statistical area levels;

based on the geographically classified demographic statistics, and the effective area of influence, generate location based market recommendations for merchants and issuers; and automatically transmitting the location based market recommendations over a network to at least one of the merchants and issuers.

13. The computer system of claim 12, wherein identifying the EAI includes identifying an EAI corresponding to a place of residence and a place of work.

14. The computer system of claim 12, wherein the geographically classified statistics, and the EAI provide a metric for tracking regional brand performance.

15. The computer system of claim 12, wherein the geographically classified statistics, and the EAI provide a metric for identifying areas for location sourcing and micromarketing.

16. The computer system of claim 12, wherein the geographically classified statistics, and the EAI provide a metric for estimating consumer expenditure.

17. A non-transitory computer-readable medium comprising computer readable instructions which when executed, cause a processor to at least:

determine, by a computer server, location-based data for making market recommendations, the computer server having access to: i) a payment transaction database, ii) statistical geography standard data defined by a governmental authority, the statistical geography standard data comprising a plurality of statistical area levels, and iii) one or more public electronic data sources comprising geographically classified demographic statistics, wherein the computer server determines the location-based data by:

access payment transactions records for a cardholder from the transaction database to retrieve transaction locations, including longitude and latitude;

use reverse geo-coding to map the longitude and latitude information of the transaction locations to the plurality of statistical area levels, wherein the plurality of statistical area levels include countries, states, counties, cities, regions of cities, and neighborhoods;

determine a number of the payment transactions the cardholder made in the plurality of statistical area levels over a predetermined time period;

determine a subregion of ones of the plurality of statistical area levels that has a highest number of domestic card present payment transactions for the cardholder; and identify an effective area of influence (EAI) for the cardholder by identifying the subregion of a lowest statistical area level that has a highest number of domestic card present transactions for the cardholder over the predetermined time period;

accessing geographically classified demographic statistics from the public data sources related to one or more of the plurality of the statistical area levels;

based on the geographically classified demographic statistics, and the effective area of influence, generate location based market recommendations for merchants and issuers; and automatically transmitting the location based market recommendations over a network to at least one of the merchants and issuers.

18. The computer readable medium of claim 17, wherein identifying the EAI includes identifying an EAI corresponding to a place of residence and a place of work.

* * * * *